United States Patent [19]

Beyrenther

[11] 4,247,198
[45] Jan. 27, 1981

[54] DUAL PURPOSE MULTIPRINT EASEL

[76] Inventor: Axel D. Beyrenther, 346 N. Western Ave., Los Angeles, Calif. 90004

[21] Appl. No.: 62,010

[22] Filed: Jul. 30, 1979

[51] Int. Cl.³ .................. G03B 27/44; G03B 27/58
[52] U.S. Cl. ........................................ 355/54; 355/74
[58] Field of Search .................................. 355/54, 74

[56] References Cited

U.S. PATENT DOCUMENTS

| | | | |
|---|---|---|---|
| 2,925,752 | 2/1960 | Van Deusen, Jr. | 355/54 |
| 3,289,531 | 12/1966 | Streit | 355/54 |
| 3,588,248 | 6/1971 | Freund et al. | 355/74 |
| 3,661,449 | 5/1972 | Wright | 355/544 |
| 3,682,547 | 8/1972 | Ratowsky | 355/74 |
| 3,728,021 | 4/1973 | Retzyl et al. | 355/74 |
| 3,823,581 | 2/1958 | Greenspan | 355/54 |
| 3,829,211 | 8/1974 | Mitchell | 355/74 |
| 3,944,364 | 3/1976 | Petrini et al. | 355/74 |
| 4,095,892 | 6/1978 | Thornton | 355/74 |
| 4,108,548 | 8/1978 | Hawkins | 355/74 |

*Primary Examiner*—Richard A. Wintercorn
*Attorney, Agent, or Firm*—Erik M. Arnhem

[57] ABSTRACT

A multiprint easel, comprising a photographic paper supporting base, provided with a raised rear edge, and slots extending parallely in and perpendicularly adjacent to a side of the base, within which spring loaded holding tabs are movably accommodated, which, together with upwardly projecting stationary tabs disposed at a base side oppositely thereto, are intended for insertion and holding of the paper on the base; a frame, mountable over the base, and panels accommodated, respectively, horizontally and vertically slidable therein, causing an opening to appear between the panels however they are manipulated on the frame; an insert placeable within and covering the opening of the frame.

4 Claims, 5 Drawing Figures

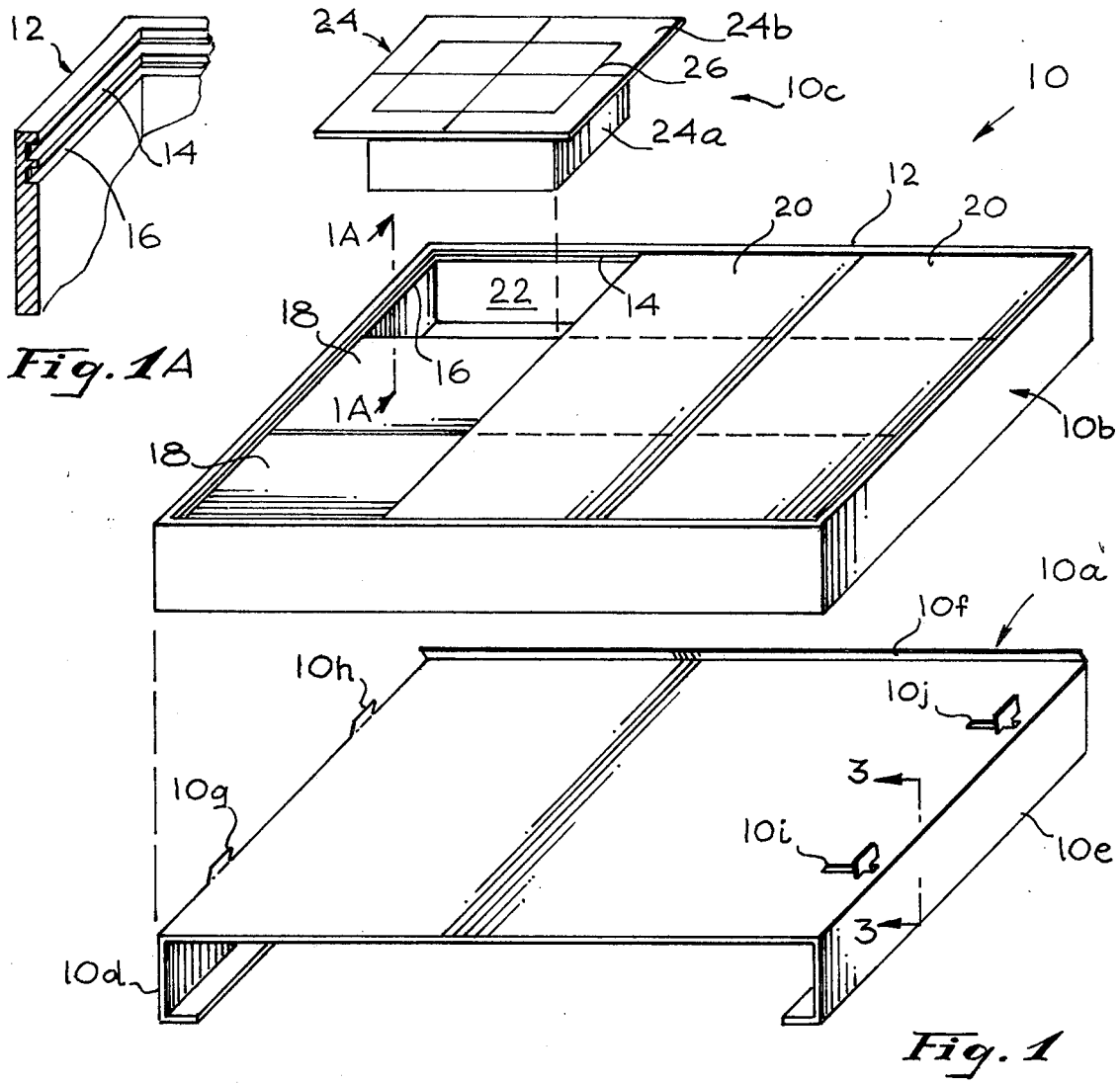
Fig. 1A
Fig. 1
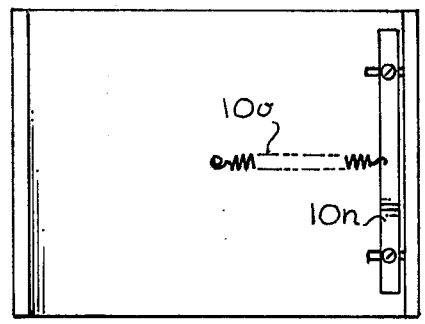
Fig. 2
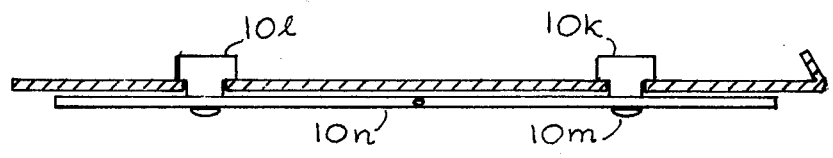
Fig. 3
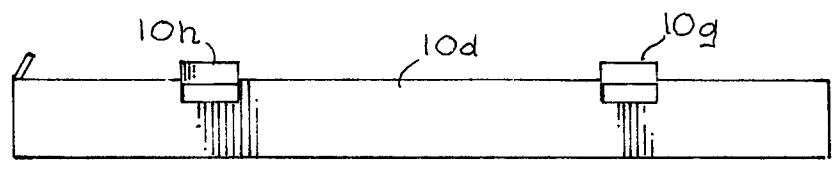
Fig. 4

DUAL PURPOSE MULTIPRINT EASEL

BACKGROUND OF THE INVENTION

1. Field of the Invention

My invention refers to facilitating and improving the selective process of obtaining a true color print.

Basically, color is our reaction to the wave length of light, as interpreted by the cones of the retina.

Modern color photography, printing and television rely on the concept that the eye responds to three basic colors: red, green and blue, ("additive primary colors"); other colors that we "see" are really combinations of the primary ones, being interpreted by the brain, as purple, brown, orange, etc.

Color photography and color printing all use "subtractive" systems. A color photograph works by reflecting light modified by dyes that act as filters, being built into three emulsion layers. Since our eyes respond to only three colors of light; red, green and blue, there is only need for three emulsion layers. By varying the amount of filtration in these three layers, all colors viewable in a color photograph are reproduced. The three filter colors in these layers, as well as in the color heads of modern enlargers are called "cyan," "magenta" and "yellow." These are the "subtractive primary colors" or "complementary colors." Each of the subtractive primaries consists of white light from which one of the additive primary colors: red, green and blue has been subtracted or removed.

Depending on the color reproduction process, e.g., making a print from a color negative or transparency, one of the complementary colors in the color head of the enlarger always remains constant, while the densities of the other two are varied to provide the correct filtration corresponding to the sensitivity of the respective layers in the emulsion of the paper.

Therefore, if we arbitrarily assign the variables X, Y and Z to the three complementary colors "cyan", "magenta" and "yellow," one of them will always remain constant while the others are varied during the process. Let Z be the constant factor, e.g., the complementary color "cyan" in printing from a negative or the complementary color "magenta" in printing from a transparency. To reproduce the correct color relationship in the final photograph, X and Y have to be in a certain relation to each other, as well as to the constant factor Z. Only one combination of these three factors will reproduce the right color on the emulsion. Even though the manufacturers of photographic paper give indications on the package as to what amount of filtration should be used for a batch of paper, the individual operator of color reproduction equipment always must resort to a "trial and error" procedure until he finally arrives at the right color combination.

This is known in the industry as a "ring-around", a procedure where all the possible deviations from a given filter combination are explored to finally arrive at the right combination.

With factor Z of a certain constant value, let us assume that the starting factors for Y and X are 0 and 0. In a "ring-around", there are eight (8) different possibilities for deviating from this neutral position; factor X can be increased or decreased, and factor Y can be varied in the same manner.

We will therefore arrive at eight different combinations of X and Y, apart from the neutral starting point. One of these new relationships between X and Y will be the correct—or approximately correct—combination for the overall relationship of colors required to reproduce the correct colors in the photograph. In other words, by starting from a given X/Y relationship and going into all eight directions of possible different X/Y relationships, the proper filtration values required for a correct color reproduction in the photographic print can be determined.

The ability to provide a NINE-position "ring-around" on one sheet of photographic paper for a very simple and quick evaluation of the correct color filtration is, in essence, the basic concept of this invention.

2. Description of the Prior Art

The following U.S. patents appear to represent the prior art with respect to my invention:

U.S. Pat. No. 3,588,248 FREUND 1971
U.S. Pat. No. 3,829,211 MITCHELL 1974
U.S. Pat. No. 3,944,364 PETRINI 1976
U.S. Pat. No. 4,095,892 THORNTON 1978
U.S. Pat. No. 4,108,548 HAWKINS 1978

None of the above cited patents appear to be directly relevant to the invented subject matter.

Furthermore, there is no present easel construction enabling the operator to produce a complete "ring-around" for evaluating the color quality of nine images on one sheet of photographic paper and in one single operation.

There are, in multiprinting, several devices which offer a set-up for printing of several images on one sheet of paper; however, none of them incorporates the smooth interaction and simple construction of components, as conceived in my invention.

SUMMARY OF THE INVENTION

In addition to what is stated under (c) and (d) above, the invention concerns an easel assembly, usable in professional and amateur darkrooms. It enables the operator of the easel to quickly make nine test prints from one negative or transparency on one sheet of photographic paper, thus obtaining a perfect "ring-around" with all possible filtration changes; the necessity of making several test prints (when, e.g., using a new unknown batch of paper, or negative, etc.) is therefore eliminated.

The easel assembly, according to the invention, may also be used to produce multiple prints of the same size from one negative or transparency, without having to refocus or make other adjustments in the enlarger.

The top portion of the easel assembly is provided with horizontally and vertically slidable elements, which in whichever position they are will always cover the entire surface of the easel, except for an open rectangular space, adapted to expose an underlying section of photographic paper to the enlarger, and then by manipulating the sliding elements, vertically or horizontally, new sections of the paper are being exposed in sequence, until all individual spaces have been exposed. A cover insert fitting into the rectangular spaces exposed in the easel, is provided, enabling the operator to position the image without the danger of fogging the previously unexposed section of the paper.

Furthermore, the cover insert may be used individually, in the beginning of the process, as a focusing device or target on the baseboard of the enlarger, since its height corresponds to the height of the easel (or the distance of the photographic paper from the baseboard) to the enlarger.

It is, therefore an object of the invention to provide an easily manipulated device for producing a complete "ring-around" of a sequence of equal photographic images on one sheet of photographic paper, each of which presenting varying color filtrations for selection of the truest color image.

It is a further object of the invention to provide a device for obtaining a sequence of identical prints of equal size on one sheet of paper.

It is still a further object of the invention to provide a self-adjusting easel assembly accommodating papers of slightly differing sizes, due to variations in manufacturing standards.

It is still another object of the invention to provide such an easel assembly, which is easy to manipulate, trouble free in operation and of simple construction.

BRIEF DESCRIPTION OF THE DRAWINGS

FIG. 1 is an exploded perspective view of the easel assembly.

FIG. 1a is an enlarged sectional detail view taken on line 1a—1a of FIG. 1.

FIG. 2 is a plan bottom view of the base of the easel.

FIG. 3 is a sectional side view of the base of the easel, taken on line 3—3 of FIG. 1.

FIG. 4 is a plan side view of the base opposite that of FIG. 3.

DESCRIPTION OF THE PREFERRED EMBODIMENT

On the drawings like reference characters designate similar parts in the several views of the invention.

In FIG. 1, numeral 10 designates the easel assembly in its entirety, made up of a base 10a, an overlapping cover 10b and an insert 10c, fitting into an opening in the cover.

The base 10a is of rectangular shape, perferably made of metal and in one integral section; its short sides 10d, 10e are bent downwardly to form substantially U-shaped raised supports for the base surface, on which the photographic paper to be processed is placed.

The rear edge of the base is provided with an upwardly extending and slightly inwardly inclining narrow flange 10f (forming an angle of about 80 degrees with the horizontal base surface) serving as a supporting edge for the photographic paper placed on the surface of base 10a.

At the left side (as viewed in FIG. 1) of base 10a, three are provided two substantially vertical projecting tabs 10g, h, protruding upwardly and inclining slightly inward. These tabs are preferably punched out from the material of support 10d. These two projections also serve as holding means for the photographic paper.

Adjacent the edge at the right-hand side of base 10a, two short parallel horizontally extending slots 10i, j, are cut to movably accommodate two adjustable holding means 10k, l, being substantially T-shaped (FIGS. 1 and 3) for the paper. The horizontal portion of holding means 10k, l (being wider than the width of slots 10i, j) ride above the slotted surface of base 10a, while its vertical portions project below the slotted underside of base 10a and are mounted securely, e.g., by means of screw connections 10m, to an elongated bar 10n (to facilitate the assembly thereof), which is accommodated underneath base 10a (FIGS. 2,3).

One end of a straight tension spring 10o is mounted at a center portion of bar 10n, the other end thereof is fastened to a point at the underside of base 10a, being perpendicular to bar 10n.

When spring 10o is under slight tension, holding means 10k, l, will be situated within slots 10i, j, respectively, at a short distance from their outer ends. One edge of the photographic paper to be placed on base 10a, is then gently pushed against holders 10k, l, which will yield outwardly in slots 10i, 10j, putting spring 10o under slightly more tension, then snapping the other sides of the paper into positions against edge 10f and projecting tabs 10g, h, thereby causing holding means 10k, l to exert slight holding pressure on the right-hand side of the paper.

Frame 10b is, preferably made of metal in one integral piece, that is, e.g., constituted by an elongated section bent into a rectangular shape; its dimensions slightly exceed those of base 10a, so when mounted thereover will completely cover the latter when being placed together on the base board of the enlarger.

The width of the upper horizontal rim 12 of frame 10b (FIG. 1) is narrow, so as not to interfere with the cone of light enanating from the enlarger.

Two grooves 14, 16 extend horizontally and parallely along the entire perimeter of the interior sides of frame 10b (FIG. 1, 1a).

Two sets of covering means, e.g., panels 18, 20 are accommodated horizontally and vertically slidable within grooves 14, 16, respectively at a favorable co-efficient of friction and cover portions of the open space within frame 10b.

The dimensions of panels 18, 20 are such that whatever positions they occupy on frame 10b, they will provide an opening 22 (FIG. 1), exposing a section of the photographic paper.

As illustrated in the drawings, the easel, according to the invention, is made to produce nine borderless prints of equal size from one negative or transparency on one sheet of, e.g., 11×14 photographic color paper, as previously explained. Two horizontal panels 18 slide, e.g., in lower groove of frame 10b while the two vertical panels 20 slide in upper groove 14. The dimensions of opening 22 for producing nine images on 11×14 paper are approximately 3.7×4.7 inches, allowing exposure of that size on the underlying photographic paper mounted on base 10a of easel 10.

The sliding accommodations of panels 18, 20 permit quick lateral manipulation of same to expose sections of the photographic paper.

A rectangularly shaped cover insert 24 is provided to be nested within any opening space (20), appearing on the easel and brought about by manipulation of panels 18, 20, as explained above.

The purpose of cover insert 24 is, primarily to allow positioning of the image on its marked surface exposure, without possibly fogging a previously unexposed section of the paper.

Cover insert 24 consists of a lower section 24a and an upper section 24b.

Section 24a is constituted as a thick rectangular block, its dimensions being somewhat smaller than the opening 20 in the panel covered frame 10b, for smooth insertion therein; the height of block 24a is substantially identical to that of the easel base, so, as noted, the same distance from negative to paper surface is achieved for focusing purposes.

The purpose of upper section 24b of cover insert 24 mounted on top and extending beyond the perimeter of section 24a, is to effectively block—when inserted in opening 20—any light that may fall from the enlarger on the paper.

The upper surface of section 24b is provided with an imprinted or engraved rectangular marking 26, corresponding to the size of opening 20 in the easel assembly, for the purpose of assuring proper focusing and alignment of the image.

The invention, obviously is not limited to the dimensions, configurations, number of panels, etc., as illustrated in the drawings. For example, a 16×20 dual purpose multiprint easel could be built, utilizing a sliding two-panel system, and allowing four 8×10 prints to be made on one sheet of 16×20 paper.

Also, one could, e.g., produce nine wallet type prints (2.6×3.3 inches) on an 8×10 easel, having four sliding panels.

The multiprint easel device, according to the invention is operated in the following manner:

The negative or slide to be printed is inserted into the carrier of the enlarger, lights are switched off and the enlarger is turned on. The projected image is now focused correctly on the surface of the cover-insert (24), which has been placed on the baseboard of the enlarger (without the easel).

The enlarger is then switched off, and, in complete darkness, a sheet of photographic paper is placed on the base (10a) of the easel by slightly pushing it against the springloaded holding means (10k, l) and securing contact with the raised rear edge of the base (10f) and the tabs (10g, h) on the left side of the base. The top part of the easel, i.e., the frame (10b), is placed over the base and the cover insert is placed in the opening of the frame which has been selected by moving the panels (18, 20).

The enlarger is now turned on again, the projected image is centered on the marked surface of the cover insert by moving the entire easel into the right position. Then the enlarger is turned off again, the cover insert removed and the enlarger turned on for the exact time period required to make the exposure.

The cover insert is now (again in total darkness) placed into another opening in the frame, which has been selected by moving the panels. Enlarger is turned on for centering the image on the surface of the cover insert by moving the entire easel, desired filtration changes are made in the colorhead of the enlarger, and the enlarger is turned off and the cover insert removed from the opening.

Now, by turning on the enlarger during the exact time period as before, a second exposure is made on the paper. This exposure is identical to the first one in image and size, with the exception that color rendition after development will differ from the first one, according to the filtration changes that were made.

This procedure continues until all nine images (or four in the case of the two-panel easel) have been exposed. The photographic paper will now be developed, dried and the results evaluated.

When using the easel for multiprinting only, the same procedure takes place with the exception of attending to the filtration changes after each step. The resulting nine (or four) images will then be equal to each other in every aspect; size, image, and color rendition.

While the foregoing has illustrated and described what is now contemplated to be the best mode of carrying out the invention, the description is, of course, subject to modifications without departing from the spirit and scope of the invention. Therefore, it is not desired to restrict the invention to the particular constructions illustrated and described, but to cover all modifications that may fall within the scope of the appended Claims.

I claim:

1. In an easel for multiprinting on photographic material:
    (a) a photographic material supporting base of rectangular shape having slots extending parallely to one another and perpendicularly adjacent a base side, two of the sides of the base are bent, respectively to form substantially U-shaped raised supports for the base, the edge of one of the unbent sides of the base is raised above the base surface, and two tabs, being punched out from the material of one of the U-shaped base supports, are caused to project above the base surface for holding the photographic material placed thereon;
    (b) two substantially T-shaped paper holding means ride within the slots of the base, the upper portions of the holding means protrude slidably on the base surface;
    (c) a bar disposed underneath the base perpendicularly to the directions of the slots therein, being mounted to the lower portions of the paper holding means;
    (d) a tension spring, extending parallely with the base slots, one end of which is mounted to the bar, the other end thereof is fastened at the underside of the base, the spring being put under tension when photographic material is pushed against the paper holding means so as to snap in place against the raised side edge and tabs on the base;
    (e) a frame mounted over and completely covering the base, having two grooves extending parallely within the interior sides of the frame along the entire perimeter thereof;
    (f) at least two elongated panels, fitted slidably in horizontal and vertical directions, respectively within the grooves of the frame, to allow openings to sequentially appear at variable locations therein;
    (g) an insert placeable within and covering the openings brought about by the sliding movements of the panels in the frame, the top portion of the insert is flanged to overlap the sides thereof and provided with an imprinted configuration to prevent light from penetrating into openings between the panels in the frame, respectively, constituting a focusing target before exposing the underlying photographic material.

2. In an easel for multiprinting on photographic material, comprising:
    (a) photographic material supporting rectangular base, having one raised side and two parallel slots extending perpendicularly adjacent to one of the other sides of the base surface;
    (b) springloaded paper holding means, being respectively, slidably mounted in the slots, against which the photographic material is pushed to snap in place along the raised side of the base;
    (c) a frame, having groves along the interior sides thereof, mounted over and covering the base;
    (d) at least two elongated panels fitted horizontally and vertically slidable, respectively within and between the grooves of the frame, to allow openings to sequentially appear at variable locations therein.
    (e) an insert placeable within and respectively covering the sequentially appearing openings in the frame, the top surface of the insert extends to overlap the sides thereof so as to prevent light from penetrating into the openings appearing between the panels.

3. An easel, according to claim 2, wherein the upper portions of the paper holding means slides on the base surface, their lower portions are, respectively fastened to a bar, extending, perpendicularly to the directions of the slots, underneath the base, the bar being mounted to one end of a spring, the other end of which is fastened to the underside of the base, the spring when put under tension, causes the holding means to yield resiliently, so that the photographic material may snap in place against the raised edge and tabs on the base.

4. An easel, according to claim 2, wherein the top surface of the insert is provided with an imprinted configuration, delineating the underlying focusing area of the respective openings appearing in the frame.

* * * * *

UNITED STATES PATENT AND TRADEMARK OFFICE
CERTIFICATE OF CORRECTION

PATENT NO. : 4,247,198
DATED : January 27, 1981
INVENTOR(S) : Axel D. Beyrenther It is certified that error appears in the above—identified patent and that said Letters Patent is hereby corrected as shown below:

ON THE TITLE PAGE: Inventor's name should read

-- Axel D. Beyreuther --.

Signed and Sealed this

Twenty-ninth Day of September 1981

[SEAL]

Attest:

GERALD J. MOSSINGHOFF

Attesting Officer

Commissioner of Patents and Trademarks